United States Patent [19]

Swerdloff et al.

[11] Patent Number: 4,517,007
[45] Date of Patent: May 14, 1985

[54] PHOSPHOROAMIDE UREASE INHIBITORS AND UREASE INHIBITED UREA BASED FERTILIZER COMPOSITIONS

[75] Inventors: Michael D. Swerdloff, Parsippany; Jaroslav F. Kolc, Randolph; Milorad M. Rogic, Whippany, all of N.J.; Larry L. Hendrickson, Camillus, N.Y.

[73] Assignee: Allied Corporation, Morris Township, Morris County, N.J.

[21] Appl. No.: 502,439

[22] Filed: Jun. 9, 1983

[51] Int. Cl.$^3$ .................................................. C05C 9/00
[52] U.S. Cl. ................................................ 71/28; 71/902
[58] Field of Search ............................. 71/11, 27–30, 71/902; 252/46.7

[56] References Cited

U.S. PATENT DOCUMENTS 3,767,733 10/1973 Dulog et al. ......................... 260/937
3,812,033 5/1974 Dulog et al. ......................... 252/46.7
4,182,881 1/1980 Bayless et al. ......................... 546/22
4,225,526 9/1980 Alaimo et al. ................... 260/397.7 R
4,242,325 12/1980 Bayless et al. ......................... 424/210

FOREIGN PATENT DOCUMENTS 830800 3/1960 United Kingdom .
1494774 12/1977 United Kingdom .

OTHER PUBLICATIONS

1978, CA, vol. 89, Abst. #89:89455k, Matzel et al.
1979, CA, vol. 90, Abst. #90:21340j, Oertel et al.
1979, CA, vol. 91, Abst. #91:122724p, Matzel et al.
1979, CA, vol. 91, Abst. #91:139619f, Heber et al.
1981, CA, vol. 94, Abst. #94:101951g, Vlek et al.
1981, CA, vol. 94, Abst. #94:139429f, Bayless et al.

Primary Examiner—Ferris H. Lander
Attorney, Agent, or Firm—Richard C. Stewart, II

[57] ABSTRACT

Novel urease inhibiting phosphoroamide compounds and urea based fertilizer compositions including such compounds, and methods and compositions for inhibiting the activity of urease through use of a urease inhibiting effective amount of one or more of the aforementioned phosphoroamide compounds.

27 Claims, No Drawings

PHOSPHOROAMIDE UREASE INHIBITORS AND UREASE INHIBITED UREA BASED FERTILIZER COMPOSITIONS

BACKGROUND OF THE INVENTION

1. Field of the Invention

This invention relates to phosphoroamide urease inhibitors and urease inhibited urea based fertilizer compositions. More particularly, this invention relates to urease inhibited urea based fertilizer compositions which contain certain phosphoroamide compounds as the urease inhibitors, and to methods of and compositions for inhibiting the catalytic activity of urease through application of such compounds to plant growth media.

2. The Prior Art

It is well known in the art to use urea and urea compositions in fertilizers, for application to the soil. The effective life of such fertilizers, however, is of short duration wherever microbiological activity exists in the soil to which the fertilizer is applied. This is due to the fact that urea is hydrolyzed rapidly, and nitrogen is lost in the form of ammonia, when urea is placed under or on the surface of soil which contains urease. Urease, a crystallizable enzyme occurring in numerous bacteria and fungi, as for example *Micrococcus urease,* catalyzes the conversion of urea into ammonia and carbon dioxide. The reactions are as follows:

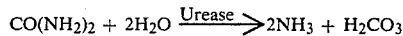

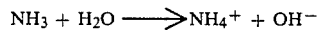

A portion of the ammonia thus formed is held by absorbing constituents of the soil and is available to plants as nutrient. However, a large amount of the ammonia may be lost to the air. A further problem resulting from the action of urease is the accumulation of ammonium in the soil which may damage germinating seedlings and young plants.

One approach to the reduction of the problems resulting from the activity of soil urease toward soil applied urea is to find compounds that inhibit urease activity when applied to soils in conjunction with fertilizer urea. This approach has received considerable attention, and several classes of compounds have been used as urease inhibitors.

For example some prior art describes various phosphoro compounds which are useful as urease inhibitors. Illustrative of such prior art are East German Pat. Nos. 142,714, 212,026, 122,177, 122,621 and 130,936 and Great Britain Pat. No. 1,494,774 describe various phosphorodiamidate compounds as urease inhibitors. U.S. Pat. No. 4,242,325 describes a method of controlling the enzymatic decomposition of urea to ammonia and carbonic acid due to the action of urease which comprises exposing the enzyme to certain phosphoric triamide compounds. U.S. Pat. No. 4,182,881 describes the use of certain N-(diaminophosphinyl)arylcarboxyamide compounds as inhibitors of the enzyme urease in the urinary tract. U.S. Pat. No. 4,225,526 describes the use of 8-([(4-aminophenyl)sulfonyl])amino-2-napthalenyl phosphorodiamidate compounds as inhibitors of the enzyme urease, and U.S. Pat. No. 4,222,948 describes the use of ([(4-aminophenyl)sulfonyl]amino])phenyl phosphorodimidates as inhibitors of the enzyme urease.

Still other prior art describes the use of certain phosphoric triamide compounds for other purposes. For example, Great Britain Pat. No. 830,800 describes certain phosphoric triamide compounds which are useful as flameproofing agents. U.S. Pat. Nos. 3,767,733 and 3,812,033 describe the use of substituted benzo(1',3',2')-dioxaphospholes derived from o-dihydroxybenzenes as lubricant additives.

SUMMARY OF THE INVENTION

In accordance with the present invention, there is provided a unique fertilizer composition comprising urea or a urea precursor compound which is capable of forming urea when subjected to the use conditions of the composition and a "urease inhibiting effective amount" of one or more phosphoroamide compounds of the formula:

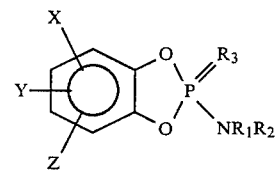

wherein:

$R_1$ and $R_2$ are the same or different and are hydrogen or alkyl having from 1 to about 4 carbon atoms;

$R_3$ is oxygen or sulfur; and

X, Y or Z are the same or different and are hydrogen, alkyl, arylamino, diarylamino, halogen, hydroxy, mercapto, alkylmercapto, amino, cyano, nitro, alkylamino, dialkylamino, arylmercapto, isocyano, isocyanato, trihalogenmethyl, alkoxy, thiocyano, alkanoyl, diaminophosphinyl, O-diaminophosphinyl, S-diaminophosphinyl, N-diaminophosphinyl, or any two X, Y and Z groups together may form an alkylene or alkenylene chain which may optionally include one or more divalent oxygen, nitrogen, or sulfur moieties forming a 3,4,5 or 6 membered fused ring structure. In the present specification and claims, the term "phosphoroamide compounds" is used to refer to the above referenced compounds.

Another aspect of this invention relates to a method of enhancing the yield and/or growth of plants by distributing the composition of this invention to the "plant growth media" in which the plants are being grown within reach of the root system of the plants (hereinafter referred to as "root zone"). As used herein, the term "plant growth media" refers to the various natural and artificial media which support plant growth, including but not limited to soil, potting mixtures of organic and inorganic matter, and artificial media such as polyurethane foam.

Yet another aspect of this invention relates to a method of inhibiting the urease catalyzed hydrolysis of urea at some situs, as for example in a plant growth media, which method comprises applying a "urease inhibiting effective amount" of one or more of the above-mentioned phosphoroamide compounds to the plant growth media or other situs prior to, after or in conjunction with the application of urea and/or one or more compounds capable of forming urea in situ to said plant growth media or other situs. Still another aspect of this invention relates to a composition comprising a "urease inhibiting effective amount" of one or more of such phosphoroamide compounds useful for carrying out such method. As used herein, a "urease inhibiting effective amount" is an amount of such phosphoroamide compounds which when applied to a plant growth media or other situs is capable of inhibiting the urease catalyzed hydrolysis of urea applied to said media or said situs to any extent.

It has been discovered that by distributing a urease inhibiting effective amount of one or more of the aforementioned phosphoroamide compounds in the said plant growth media, the urease catalyzed hydrolysis of urea to ammonia is suppressed, thereby retarding the rate at which urea is lost from the media. Furthermore, by proper distribution of the one or more phosphoroamide compounds in the plant growth media, this action of inhibiting the hydrolysis of urea to ammonia is effective over a prolonged period of time.

DETAILED DESCRIPTION OF THE INVENTION

The application of a urease inhibiting effective amount of one or more of the above-identified phosphoroamide compounds to some situs, as for example a plant growth media is essential for the practice of this invention. While the above described phosphoroamide compounds can be used to inhibit urease catalyzed hydrolysis in many different situs, they are preferred for use in inhibiting the activity of urease in a plant growth media. When used in the preferred embodiments of the invention, usually, at least about 0.01 parts of said one or more phosphoroamide compounds per million parts of said plant growth media will be applied to the plant growth media. Hereinafter the abbreviation "p.p.m." will be used to refer to parts by weight of one or more phosphoroamide compounds per one million parts by weight of plant growth media. In the preferred embodiments of this invention, the amount of said one or more phosphoroamide compounds distributed in said plant growth media is from about 0.01 to about 5000 p.p.m., and in the particularly preferred embodiments is from about 0.2 to about 1000 p.p.m. Amongst these particularly preferred embodiments, most preferred are those embodiments in which the amount of said one or more phosphoroamide compounds distributed in said plant growth media is from about 1 to about 500 p.p.m.

Within the above referenced limits, the particular amounts of one or more phosphoroamide compounds used are dependent upon the particular situation. Thus, in determining the amount to be employed, consideration is made not only of the treatment need, i.e., soil pH, temperature, soil type, etc., but also of the mode of application to soil. When the one or more phosphoroamide compounds is to be applied in a broadcast application, the amount in p.p.m. may frequently be less than in row or band applications where, for a substantial depth and width within the vicinity of application, there can be a very high concentration of the one or more phosphoroamide compounds. When application is made near the root zone of growing plants, or when application is made immediately prior to seeding or transplanting, the amounts supplied are frequently at a lower rate than when application is made at the end of the growing season to prepare the soil for the following season. By dispersing very large dosages in growth media, a prolonged inhibition of the activity of urease can be obtained over a period of many months. The concentration of the active one or more phosphoroamide compounds is eventually reduced to a minimum by decomposition in the soil or other plant growth media.

In one method for carrying out the present invention, the one or more phosphoroamide compounds are distributed throughout the growth media in a broadcast application such as by spraying, dusting, distributing in irrigation water, and the like. In such application, the one or more phosphoroamide compounds are supplied in amounts sufficient to permeate the growing area of the plant growth media with a urease inhibiting effective amount of such compounds. In field administration, the one or more phosphoroamide compounds can be distributed in the plant growth media in an amount and through such cross-section of the plant growth media as to provide for the presence therein of a urease inhibiting effective amount of such compounds. It is usually preferred that the one or more phosphoroamide compounds be distributed below the surface of the plant growth media.

In another method for carrying out the present invention, the one or more phosphoroamide compounds are administered to the plant growth media in a band or row application. In such application, administration is made with or without one or more carriers in amounts sufficient to supply to the soil or other plant growth media a urease inhibiting effective amount of the one or more phosphoroamide compounds. After administration with or without discing or dragging, subsequent irrigation or rainfall distributes the one or more phosphoroamide compounds throughout the plant growth media.

In one embodiment of the present invention, the one or more phosphoroamide compounds is distributed throughout the plant growth media prior to seeding or transplanting the desired crop plant.

In another embodiment, the soil in the root zone of growing plants is treated with the one or more phosphoroamide compounds in an amount effective to inhibit the activity of urease, but sublethal to plant growth. By following such practice, no adverse effect is exerted by the one or more phosphoroamide compounds upon growth of seeds or plants. Oftentimes, it is desirable to treat the soil or plant growth media adjacent to plants, and this procedure may be carried out conveniently in side-dressing operations.

In a further embodiment, soil or other plant growth media can be treated with a urease inhibiting effective amount of phosphoroamide compounds following harvest to prevent rapid loss of urea. Such practice conserves the soil nitrogen for the following growing season. In such application, the upper limit is primarily an economic consideration.

The present invention can be carried out by distributing the one or more phosphoroamide compounds in an unmodified form throughout the plant growth media. The present method also embraces distributing one or more such compounds as a constituent in liquid or finely divided solid urease inhibiting compositions.

The concentration of one or more phosphoroamide compounds in compositions to be employed for the treatment of plant growth media is not critical and can vary considerably provided a urease inhibiting effective amount is supplied to the plant growth media. In general, good results are obtained with liquid and solid compositions containing at least about 0.00001 percent by weight of the one or more phosphoroamide compounds based on the total weight of the compositions. In the preferred embodiments of the invention, the weight percent of one or more phosphoroamide compounds contained in said composition is from about 0.00001 to about 98 percent or more on the aforementioned basis, and in the particularly preferred embodiments is from about 0.001 to about 50 weight percent also on the aforementioned basis. Amongst these particularly preferred embodiments, most preferred are those embodiments in which the weight percent of said compounds contained in said composition is from about 0.002 to about 20, and ideally from about 0.01 to about 10. Liquid or solid compositions in which the one or more phosphoroamide compounds are present in higher concentration can be utilized as such or can be employed as concentrate compositions to be diluted to prepare actual treating compositions.

In the composition of this invention, the one or more phosphoroamide compounds can be modified with one or more additaments or soil treating adjuvants including water, petroleum distillates or other liquid carriers, surface-active dispersing agents, inert finely divided solids and fertilizers, such as urea or one or more compounds capable of forming urea in situ. These adjuvants cooperate with the one or more phosphoroamide compounds so as to facilitate the practice of the present invention and to obtain an improved result. Preferred adjuvants are surface-active dispersing agents, inert finely divided solids, and various plant micro- and macro-nutrients, especially urea and/or urea precursor compounds capable of forming urea in situ. Urea is a well known, commercially available compound and will not be discussed herein in detail. Illustrative of compounds which are believed to form urea on addition to a plant growth media and which are water soluble are formaldehyde condensation products, as for example, methylolureas, methyleneureas and mixtures thereof. These products and a method for their preparation are described in detail in U.S. Pat. No. 3,462,256. Still other useful sources of urea are water-insoluble urea formaldehyde condensation products such as ureaform. Illustrative of useful water-insoluble urea and formaldehyde condensation products are those whose preparation and use are described in detail in U.S. Pat. Nos. 3,677,736 and 4,033,745.

The amount of urea or urea precursor compound included in the composition of this invention is not critical to the unique advantages thereof, and any amount of urea and/or the urea precursor compound used in conventional fertilizers can be used in the conduct of this invention. Normally, the amount employed will vary widely depending on a number of factors, including the times and frequency of application. In the preferred embodiments of the invention, the quantity of urea or urea precursor compound may vary from about 0.5 to about 95 weight percent based on the total weight of the composition and in the particularly preferred embodiments may vary from about 1 to about 50 weight percent on the same basis. In the most preferred embodiments of this invention, the quantity of urea or urea precursor compound will vary from about 3 to about 40 weight percent on the aforementioned basis.

The composition of this invention preferably includes other optional ingredients known to those of skill in the art for inclusion in fertilizer compositions. For example, the composition may include sources of potassium, sulfur, phosphorus, boron, zinc, iron, manganese, copper, molybdenum, cobalt and like micronutrient and macronutrients which may be deficient in the soil. The composition may also include plant growth regulators, as for example auxins, cytokinins and the like, as well as pesticides, such as insecticides, miticides, herbicides, nematocides and the like.

Liquid compositions containing the desired amount of one or more phosphoroamide compounds and other optional ingredients can be prepared by dispersing the latter in one or more liquid carriers, such as water or an organic solvent with or without the aid of a suitable surface active dispersing agent or emulsifying agent. Suitable organic solvents include acetone, diisobutylketone, methanol, ethanol, isopropyl alcohol, diethyl ether, toluene, methylene chloride, chlorobenzene and petroleum distillates. The preferred organic solvents are those which are of such volatility that they leave little permanent residue in the growth media. Dispersing and emulsifying agents which can be employed in liquid compositions include non-ionic, anionic, amphoteric and cationic dispersing agents, such as condensation products of alkylene oxides with phenols and organic acids, alkyl aryl sulfonates, polyoxyalkylene derivatives of sorbitol esters, sugar esters, complex ether alcohols, mahogany soaps, quaternary ammonium compounds and the like. The surface active agents are generally employed in the amount of from about 1 to about 20 percent by weight of the composition.

Solid compositions containing the active one or more phosphoroamide compounds and other optional ingredients can be prepared by dispersing the latter in finely divided inert solid carriers such as talc, chalk, gypsum, vermiculite, bentonite and the like, fuller's earth, attapulgite and other clays, various solid detergent dispersing agents and solid fertilizer compositions. In preferred method of preparing such compositions, the carrier is mechanically ground with one or more solid phosphoroamide compounds; wet with one or more liquid phosphoroamide compounds; or wet with a solution or dispersion of one or more solid or liquid phosphoroamide compounds in a volatile organic solvent. Depending upon the proportions of ingredients, these compositions can be employed without further modification or be considered concentrates and subsequently further diluted with solid surface active dispersing agents, talc, chalk, gypsum or the like to obtain the desired treating composition. Furthermore, such concentrate compositions can be dispersed in water with or without added dispersing agent or agents to prepare aqueous soil treating compositions.

The required amount of the one or more phosphoroamide compounds contemplated herein may be applied per acre treated in from about 1 to about 200 gallons or more of liquid carrier and/or diluent or in from about 5 to about 500 pounds of inert solid carrier and/or diluent. The concentration in the liquid concentrate will usually vary from about 10 to about 95 percent by weight and in the solid formulations from about 0.5 to about 90 percent by weight. Satisfactory sprays, dusts, or granules for general use contain from about ¼ to about 15 pound of active one or more phosphoroamide compounds per acre.

The compounds contemplated herein prevent or retard the urease catalyzed hydrolysis of urea, and they have relatively high residual activity. With respect to plants they have a high margin of safety in that when used in sufficient amount to inhibit the activity of urease, they do not burn or injure the plant, and they resist weathering which includes wash-off caused by rain, decomposition by ultra-violet light, oxidation, or hydrolysis in the presence of moisture or, at least such decomposition, oxidation, and hydrolysis as would materially decrease the desirable urease inhibiting characteristic of the compounds or impart undesirable characteristics, for instance, phytotoxicity, to the compounds. The compounds are so chemically inert that they are compatible with substantially any other constituents of the spray schedule, and they may be used in the soil, upon the seeds, or the roots of plants without injuring either the seeds or roots of plants.

While the composition and method of this invention are particularly suited for agricultural applications for prevention or inhibition of urease catalyzed hydrolysis of urea, they can also be used in other applications where inhibition of the activity of urease is desired. For example, such other applications include use in animal litters, as feed additives, diaper treatments, pharmaceutical applications, urease inhibition in mammalian urinary tracts, and the like. It should be noted that the particular active compound employed in one application may not necessarily be useful in another application. Thus, in the selection of a particular active material for use in an application, such factors as toxicity of the material, the environment in which the material will be used, level of urease inhibition desired and the like must be considered in selecting such material.

The novel phosphoroamide compounds of this invention which are useful as urease inhibitors in the composition and method of this invention are those of the formula:

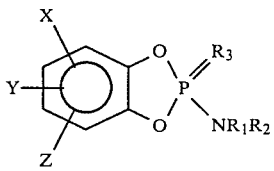

wherein:

$R_1$ and $R_2$ are the same or different and are hydrogen or alkyl having from 1 to about 4 carbon atoms;

$R_3$ is oxygen or sulfur; and

X, Y and Z are the same or different and are hydrogen, alkyl, arylamino, diarylamino, halogen, hydroxy, mercapto, alkylmercapto, O-diaminophosphinyl, S-diaminophosphinyl, N-diaminophosphinyl, diaminophosphinyl, amino, cyano, nitro, alkylamino, dialkylamino, arylmercapto, isocyano, isocyanato, trihalomethyl, alkoxy, thiocyano, alkanoyl, or any two X, Y, and Z group together may form an alkylene or alkenylene chain which may optionally include one or more divalent oxygen, nitrogen, or sulfur moieties forming a 3, 4, 5, or 6 membered fused ring structure.

Illustrative of permissible X, Y and Z substituents are hydrogen; alkyl, such as methyl, ethyl, propyl, isopropyl, butyl, isobutyl, pentyl, hexyl, neopentyl and the like; halogen such as chloro, bromo, fluoro or iodo; alkylmercapto and arylmercapto, such as methylmercapto, ethylmercapto, propylmercapto, phenylmercapto and the like; amino or alkyl or aryl substituted amino, such as methylamino, dimethylamino, ethylmethylamino, phenylamino and the like; trihalomethyl, such as trifluoromethyl, trichloromethyl and the like; alkoxy, such as methoxy, ethoxy, propoxy, butoxy and the like; alkanoyl such as acetyl, butanoyl, hexanoyl and the like, and other substituents within the scope of the aforementioned structural formula.

Examples of useful $R_1$ and $R_2$ substituents are hydrogen and alkyl such as methyl, ethyl, propyl and butyl.

The following compounds are illustrative of phosphoroamide compounds within the scope of the generic formula set forth above which can be prepared in accordance with the procedures set forth hereinbelow and which can be employed in the practice of this invention.

5-Tert-butyl-2-amine-2-oxide-1,3,2-benzodioxaphosphole
4,6-Di-tert-butyl-2-amine-2-oxide-1,3,2-benzodioxaphosphole
4-Methyl-2-amine-2-oxide-1,3,2-benzodioxaphosphole
5-Isopropyl-2-amine-2-oxide-1,3,2-benzodioxaphosphole
4,7-Dimethyl-2-amine-2-oxide-1,3,2-benzodioxaphosphole
4,6-Diisopropyl-2-amine-2-oxide-1,3,2-benzodioxaphosphole
4-Chloro-2-amine-2-oxide-1,3,2-benzodioxaphosphole
3-Bromo-2-amine-2-oxide-1,3,2-benzodioxaphosphole
4,6-Dichloro-2-amine-2-oxide-1,3,2-benzodioxaphosphole
4-Fluoro-2-amine-2-oxide-1,3,2-benzodioxaphosphole
5-Nitro-2-amine-2-oxide-1,3,2-benzodioxaphosphole
5-Cyano-2-amine-2-oxide-1,3,2-benzodioxaphosphole
5-Chloro-4-methyl-2-amine-2-oxide-1,3,2-benzodioxaphosphole
4-Methoxy-2-amine-2-oxide-1,3,2-benzodioxaphosphole
5-Ethylmercapto-2-amine-2-oxide-1,3,2-benzodioxaphosphole
4-Bromo-5-methoxy-2-amine-2-oxide-1,3,2-benzodioxaphosphole
5,6-Dimethoxy-2-amine-2-oxide-1,3,2-benzodioxaphosphole
5-Phenyl-2-amine-2-oxide-1,3,2-benzodioxaphosphole
5-(N,N-Dimethylamino)-2-amine-2-oxide-1,3,2-benzodioxaphosphole
5-(N,N-Diphenylamino)-2-amine-2-oxide-1,3,2-benzodioxaphosphole
5-Acetyl-2-amine-2-oxide-1,3,2-benzodioxaphosphole
5-Amino-2-amine-2-oxide-1,3,2-benzodioxaphosphole
5-Phenylmercapto-2-amine-2-oxide-1,3,2-benzodioxaphosphole
4-Chloro-5-nitro-2-amine-2-oxide-1,3,2-benzodioxaphosphole
5-Iodo-2-amine-2-oxide-1,3,2-benzodioxaphosphole
4,7-Dichloro-2-amine-2-oxide-1,3,2-benzodioxaphosphole
5-Benzyl-2-amine-2-oxide-1,3,2-benzodioxaphosphole
4-Methyl-6-tert-butyl-2-amine-2-oxide-1,3,2-benzodioxaphosphole
4-Octyl-2-amine-2-oxide-1,3,2-benzodioxaphosphole
5-Dodecyl-2-amine-2-oxide-1,3,2-benzodioxaphosphole
3-Hydroxy-2-amine-2-oxide-1,3,2-benzodioxaphosphole
4-Hydroxy-2-amine-2-oxide-1,3,2-benzodioxaphosphole
4,7-Difluoro-2-amine-2-oxide-1,3,2-benzodioxaphosphole
4-Chloro-5-fluoro-2-amine-2-oxide-1,3,2-benzodioxaphosphole
2-Amine-2-thio-1,3,2-benzodioxaphosphole
5-Tert-butyl-2-amine-2-thio-1,3,2-benzodioxaphosphole
4,6-Di-tert-butyl-2-amine-2-thio-1,3,2-benzodioxaphosphole
4-Methyl-2-amine-2-thio-1,3,2-benzodioxaphosphole
4,7-Dimethyl-2-amine-2-thio-1,3,2-benzodioxaphosphole
4,6-Diisopropyl-2-amine-2-thio-1,3,2-benzodioxaphosphole 5-Isopropyl-2-amine-2-thio-1,3,2-benzodioxaphosphole
4-Chloro-2-amine-2-thio-1,3,2-benzodioxaphosphole
4-Fluoro-2-amine-2-thio-1,3,2-benzodioxaphosphole
5-Nitro-2-amine-2-thio-1,3,2-benzodioxaphosphole
4-Chloro-5-nitro-2-amine-2-thio-1,3,2-benzodioxaphosphole
5-Methoxy-2-amine-2-thio-1,3,2-benzodioxaphosphole
4-Iodo-2-amine-2-thio-1,3,2-benzodioxaphosphole
3-Methylmercapto-2-amine-2-thio-1,3,2-benzodioxaphosphole
5-Acetyl-2-amine-2-thio-1,3,2-benzodioxaphosphole
4,7-Dichloro-2-amine-2-thio-1,3,2-benzodioxaphosphole
Thiophosphorodiamidic acid 4-(2-amine-2-thio-1,3,2-benzodioxaphosphole)ester
Thiophosphorodiamidic acid 4-(2-amine-2-thio-1,3,2-benzodioxaphosphole)ester Preferred for use in the practice of this invention are phosphoroamide compounds in which:

$R_3$ is oxygen;

$R_1$ and $R_2$ are individually hydrogen or methyl; and

X, Y and Z are individually hydrogen, diaminophosphinyl, N-diaminophosphinyl, S-diaminophosphinyl, N-diaminophosphinyl, alkyl, amino, alkoxy, nitro and trifluoromethyl.

Particularly preferred for use in this invention are compounds in which:

$R_3$ is oxygen;

X is alkyl, N-diaminophosphinyl, S-diaminophosphinyl, N-diaminophosphinyl, or diaminophosphinyl; and $R_1$, $R_2$, Y and Z are hydrogen.

Among these particularly preferred compounds, most preferred are those compounds in which:

$R_3$ is oxygen;

$R_1$, $R_2$, Y and Z are hydrogen; and

X is alkyl having from 1 to 4 carbon atoms, hydrogen, O-diaminophosphinyl or N-diaminophosphinyl.

Especially effacious compounds for use in the practice of this invention are phosphorodiamidic acid 2-amine-2-oxide-1,3,2-benzodioxaphosphole ester; phosphorodiamidic acid 4-(2-amine-2-oxide-1,3,2-benzodioxophosphole)ester; and phosphorodiamidic acid 5-(2-amine-2-oxide-1,3,2-benzodioxaphosphole)ester.

Compounds which are useful in the practice of this invention can be prepared in accordance with the following reaction scheme:

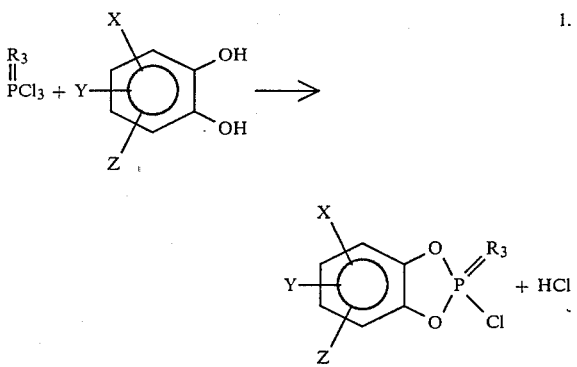

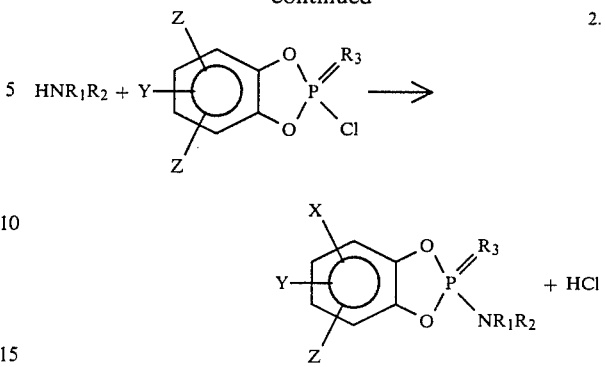

in which X, Y, Z, $R_1$, $R_2$, and $R_3$, are as defined hereinabove.

The aforementioned reaction scheme is described in more detail in East German Patent No. 128,315, Roth, H. J., et al., Synthesis of Phenyl Phosphorodiamidates. Part I., Arch. Pharm., 314, pp. 85-91, (1980) and references cited therein, V. V. Katyshkina and M. Ya. Kraft, J. Gen. Chem. USSR 26, 3407-12 (1956), and L. G. Dulog, et al. in U.S. Pat. Nos. 3,767,733 (1973) and 3,812,033, (1974) and references cited therein. Accordingly this reaction scheme will not be described herein in any great detail.

Briefly stated, in each step of the two step reaction sequence, substantially equal molar amounts of the reactants or excesses thereof are contacted neat or in an inert solvent, optionally, in the presence of a hydrogen chloride acceptor. Inert solvents which can be used in this reaction include benzene, ethyl ether, toluene, tetrahydrofuran, xylene, dioxane, methylene chloride, dimethylformamide, carbon tetrachloride, methyl sulfoxide and the like.

Useful hydrogen chloride acid acceptors can be either inorganic or organic bases. Suitable acid acceptors include alkali metal carbonates such as sodium and potassium carbonates, but preferably tertiary amines such as pyridine, triethylamine, trimethylamine, isoquinoline, lutidine, tributylamine, 1,4-diazabicyclo[2,2,2]octane, N-ethyl piperidine, quinoline and the like. Alternatively, an excess of the amine reactant is used as the acid acceptor.

Reaction temperatures are not critical and can be varied widely. For example, the reaction can be conveniently carried out in a temperature of from about −20° C. to about 200° C., but is preferably carried out at a temperature of from about 25° C. to about 125° C.

Similarly, reaction pressures are not critical and can be varied widely. For example, the reaction can be carried out at sub-atmospheric, atmospheric or superatmospheric pressure. However, for convenience, the reaction is carried out at atmospheric or autogeneous pressure.

The order in which the various reagents are reacted as indicated in the above reaction sequence is only for illustrative purposes, and the order of reaction is not critical.

The exact proportions of the reactants are not critical, some of the desired product being obtained when the reactants are employed in any proportions. However, in going to completion, the reaction consumes the reactants and the hydrogen chloride acceptor in equimolar proportions and the use of the reactants and the hydrogen chloride acceptor in such proportions is preferred.

Reaction times are not critical and can vary widely, depending on a number of factors including but not limited to reaction temperature, and the reactivities of the various reactants. The mixture is held within the desired reaction temperature range for a period of time, conveniently from about 1 to about 24 hours before cooling. Good yields are obtained with reaction times of about 4 to about 5 hours.

During the reaction, the hydrochloride salt of the hydrogen chloride acceptor forms and may precipitate from the mixture. This salt can be removed by such conventional procedures as extraction, filtration or centrifugation. The phosphoroamide compound can be separated by such conventional procedures as evaporation and purified by conventional procedures such as distillation and extraction. The product separated as described above may be employed in the control of urease in soil or may be further purified by conventional procedures such as extraction and distillation.

The following specific examples are presented to more particularly illustrate the invention.

EXAMPLE I

Preparation of 2-Amine-2-oxide-1,3,2-benzodioxaphosphole

A. A stirred mixture of 33.0 g (0.30 mol) of catechol, 110 ml (184 g, 1.2 mol) of phosphorus oxychloride, and 0.99 g of potassium chloride was heated in a flask equipped with a condenser attached to a sodium hydroxide trap separated by a drying tube. The solution became homogeneous at about 100° C. and evolution of hydrogen chloride began shortly thereafter. The mixture was heated at reflux (110° C.) for 8 h, and then excess phosphorus oxychloride was removed by vacuum distillation. The sticky, cream colored residue was washed with 9:1 ether-hexane, filtered, and dried under vacuum over $P_2O_5$ at 35° C. to give 33 g (65%) of still somewhat sticky solid, mp 107°–125° C.; $^1$H NMR (CDCl$_3$):δ6.92 (main s) with shoulders at 7.01, 7.12, and 7.25 ppm.

B. The crude solid from above was stirred with 1000 mL of methylene chloride, filtered to remove about 4.5 g of residue, and the filtrate was placed in an addition funnel. The filtrate was then added dropwise to 750 mL of cold (0° C.) ether which was continually saturated with ammonia gas. The addition was complete in 1.5 h, and then stirring and ammonia addition were continued for another 30 minutes during which time the ice bath was removed. The mixture was filtered, washed well with ether, and then dried under nitrogen to give 19.4 g of product contaminated with ammonium chloride. A portion of this material was washed with ice-water to give (with much loss of product) a white solid, mp 125°–150°; $^1$H NMR (DMSO-d$_6$): δ 6.61 (br s, 2, ArH) and 5.05 ppm (br s, 1 NH$_2$).

EXAMPLE II

Preparation of Phosphorodiamidic Acid 4-(2-Amine-2-oxide-1,3,2-benzodioxaphosphole)Ester A. A stirred mixture of 37.8 g (0.30 mol) of pyrogallol, 138 mL (230 g, 1.5 mol) of phosphorus oxychloride, and 0.9 g of potassium chloride was heated in a flask equipped with a condenser attached to a sodium hydroxide trap separated by a drying tube. The pyrogallol dissolved immediately in the phorphorus oxychloride to give a clear solution. The solution turned pink, however, upon heating. Evolution of hydrogen chloride began at about 90° C. The mixture was heated at reflux (110° C.) for 16 h by which time it had solidified into a pink-white mass. The solid was broken-up into a powder under pentane, filtered, washed well with pentane and then ether, and dried under vacuum over $P_2O_5$ at 70° C. The slightly pink solid partially melted from 235°–265° C., and was mostly insoluble in common organic solvents. An $^1$H NMR (acetone-d$_6$) showed a multiplet at δ 6.70 ppm.

B. A solution of 1500 mL of cold (0° C.) ether continuously saturated with ammonia gas was prepared in a flask equipped with a condenser, a mechanical stirrer, and an adapter containing a wide-mouth funnel and a side-arm inlet for nitrogen. The solid from step A was added through the funnel over a 30 min. period, while a nitrogen stream was maintained to keep the ammonia gas away from the solid. The mixture was stirred vigorously for another 1.5 h at 0° C., and then for 1 h after removal of the ice-bath. The ammonia flow was continued throughout the stirring period. The solids were collected by filtration, washed with ether, and dried under nitrogen. The crude product was quite water soluble and the $^1$H NMR (D$_2$O) showed two multiplets at δ 6.90 and 6.82 ppm superimposed over a broad singlet at about δ7.2–6.6 ppm (NH). The crude product was separated from ammonium chloride by stirring with 1000 mL of acetone for 30 min. The ammonium chloride was removed by filtration, and the filtrate was evaporated to provide 39 g (49%) of the crude product as an oily solid. The crude product was further purified by dissolving it in 200 mL of acetone and adding this solution dropwise to 1700 mL of ether. The resulting solid was collected by filtration, washed with ether, and dried over $P_2O_5$ in a vacuum at 70° C. to give 25 g of an almost white powder, mp 110°–123° C. (dec); $^1$H NMR (DMSO-d$_6$) δ7.0–6.0 (m, 3, ArH) and 5.9–4.3 ppm (br s, 6, NH$_2$).

EXAMPLE III

Preparation of Phosphorodiamidic Acid 5-(2-Amino-2-oxide-1,3,2-benzodioxaphosphole)Ester A. A stirred mixture of 3.4 g (0.027 mol) of 1,2,4-trihydroxybenzene, 25 mL (41.4 g, 0.27 mol) of phosphorus oxychloride, and 0.100 g of potassium chloride was heated in a flask equipped with a condenser attached to a sodium hydroxide trap separated by a drying tube. The solid dissolved at about 80° C. to give a dark colored solution, and evolution of hydrogen chloride shortly thereafter. The mixture was heated at reflux (110° C.) for 10 h and then cooled to room temperature to give an almost white precipitate. The mixture was diluted with 20 mL of carbon tetrachloride, filtered, and the solid washed with carbon tetrachloride. The solid was too insoluble to take an NMR and too sticky to get a good melting point.

B. The solid from Step A was added to 200 mL of cold (0° C.) ether continuously saturated with ammonia gas using the apparatus and procedure described in Example II, Step B. The resulting white solid was very water soluble, but insoluble in organic solvents. It was thus used as obtained as a mixture with ammonium chloride: $^1$H NMR (D$_2$O): δ 7.4–6.7 and 6.7–6.3 (ppm) (m, ArH).

EXAMPLE IV

Urease Inhibition Efficacy Test

Efficacy tests were conducted to evaluate the efficacy of representative compounds as urease inhibitors. The inhibition tests were run in a New York soil (Cazenovia silt loam, pH 7.0). Evaluations (run in triplicate) consisted of applying 800 micrograms of the test compound in 5 mL of water and 42.8 mg of urea in 1 mL of water to 20 g of air-dry soil in a glass bottle. The bottle was capped with perforated aluminum foil and incubated at 25° C. for three days prior to extraction with 100 mL of a 2M KCl solution containing 0.5 mg of phenylmercuric acetate. The extracts were then analyzed for remaining urea using an autoanalyzer. Percent inhibition was calculated as $$\% \text{ Inhibition} = \left(1 - \frac{A - B}{A - C}\right) \times 100\%$$

where A is urea recovered from an unincubated sample (urea added to soil and immediately extracted); B is urea recovered from an inhibited sample; and C is urea recovered from the control (uninhibited sample).

The results of these tests are set forth in the following Table I.

TABLE 1

| Experiment Number | Compounds | % Inhibition 40 micrograms per gram Cazenovia soil |
|---|---|---|
| 1 | Phosphorodiamidic Acid 2-Amine-2-oxide-1,3,2-benzodioxaphosphole Ester | 54 |
| 2 | Phosphorodiamidic Acid 4-(2-Amine-2-oxide-1,3,2-benzodioxaphosphole) Ester | 5 |
| 3 | Phosphorodiamidic Acid 5-(2-Amine-2-oxide-1,3,2-benzodioxaphosphole) Ester | 21 |

What is claimed is:

1. A composition comprising an acceptable carrier and a urease inhibiting effective amount of one or more phosphoroamide compounds of the formula:

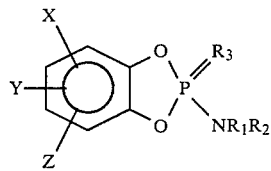

wherein:
$R_1$ and $R_2$ are the same or different and are hydrogen or alkyl having from 1 to about 4 carbon atoms;
$R_3$ is oxygen or sulfur; and
X, Y or Z are the same or different and are hydrogen, alkyl, N-diaminophosphinyl, O-diaminophosphinyl, S-diaminophosphinyl, arylamino, diarylamino, halogen, hydroxy, mercapto, alkylmercapto, diaminophosphinyl, amino, cyano, nitro, alkylamino, dialkylamino, arylmercapto, isocyano, isocyanato, trihalomethyl, alkoxy, thiocyano, alkanoyl, or any two X, Y and Z group together may form an alkylene or alkenylene chain which may optionally include one or more divalent oxygen, nitrogen, or sulfur moieties forming a 3,4,5 or 6 membered fused ring structure.

2. A composition according to claim 1 wherein said urease inhibiting effective amount is at least about 0.00001 weight percent based on the total weight of the composition.

3. A composition according to claim 2 wherein said amount is from about 0.00001 to about 98 weight percent.

4. A composition according to claim 3 wherein said amount is from about 0.001 to about 50 weight percent.

5. A composition according to claim 4 wherein said amount is from about 0.002 to about 20 weight percent.

6. A composition according to claim 5 wherein said amount is from about 0.01 to about 10 weight percent.

7. A composition according to claim 1 wherein $R_3$ is oxygen.

8. A composition according to claim 1 wherein $R_1$ and $R_2$ are the same or different and are individually hydrogen or methyl.

9. A composition according to claim 8 wherein $R_1$ and $R_2$ are hydrogen.

10. A composition according to claim 1 wherein X, Y and Z are the same or different and are alkyl, hydrogen, halogen, N-diaminophosphinyl, S-diaminophosphinyl, O-diaminophosphinyl, diaminophosphinyl, amino, alkoxy, nitro or trifluoromethyl.

11. A composition according to claim 10 wherein X is hydrogen, alkyl, diaminophosphinyl, N-diaminophosphinyl, O-diaminophosphinyl or S-diaminophosphinyl; and Y and Z are hydrogen.

12. A composition according to claim 11 wherein X, Y and Z are hydrogen.

13. A composition according to claim 1 wherein:
$R_3$ is oxygen;
Z, Y and Z are the same or different and are alkyl, halogen, hydrogen, N-diaminophosphinyl, S-diaminophosphinyl, O-diaminophosphinyl, diaminophosphinyl, amino, alkoxy, nitro or trifluoromethyl; and
$R_1$ and $R^2$ are hydrogen.

14. A composition according to claim 13 wherein:
$R_3$ is oxygen;
X is hydrogen, alkyl, N-diaminophosphinyl, O-diaminophosphinyl, S-diaminophosphinyl or diaminophosphinyl; and
Y and Z are hydrogen.

15. A composition according to claim 1 wherein said one or more compounds are selected from the group consisting of 2-amine-2-oxide-1,3,2-benzodioxaphosphole; phosphorodiamidic acid 4-(2-amine-2-oxide-1,3,2-benzodioxophosphole)ester; and phosphorodiamidic acid 5-(2-amine-2-oxide-1,3,2-benzodioxaphosphole)ester.

16. An improved fertilizer composition comprising urea and/or one or more urea precursor compounds which are capable of forming urea in situ when subjected to the use conditions of the composition, and a urease inhibiting effective amount of one or more compounds of the formula:

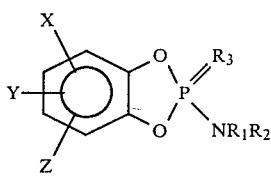

wherein:

R$_1$ and R$_2$ are the same or different and are hydrogen or alkyl having from 1 to about 4 carbon atoms;

R$_3$ is oxygen or sulfur; and

X, Y or Z are the same or different and are hydrogen, alkyl, arylamino, diarylamino, halogen, hydroxy, mercapto, alkylmercapto, amino, cyano, nitro, alkylamino, diaminophosphinyl, dialkylamino, arylmercapto, isocyano, isocyanato, trihalomethyl, N-diaminophosphinyl, S-diaminophosphinyl, O-diaminophosphinyl, alkoxy, thiocyano, alkanoyl, or any two X, Y and Z group together may form an alkylene or alkenylene chain which may optionally include one or more divalent hetero atoms of oxygen, nitrogen or sulfur forming a 3,4,5 or 6 membered fused ring structure.

17. A method of enhancing plant growth and crop yield which comprises applying an effective amount of the composition according to claim 16 to the plant growth media within the root zone of said plant.

18. A method of inhibiting the urease catalyzed hydrolysis of urea at a situs which comprises applying to said situs a urease inhibiting effective amount of one or more compounds of the formula:

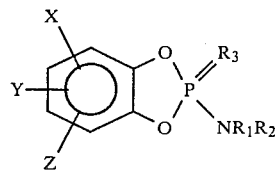

wherein:

R$_1$ and R$_2$ are the same or different and are hydrogen or alkyl having from 1 to about 4 carbon atoms;

R$_3$ is oxygen or sulfur; and

X, Y or Z are the same or different and are hydrogen, N-diaminophosphinyl, S-diaminophosphinyl, O-diaminophosphinyl, alkyl, arylamino, diarylamino, halogen, hydroxy, mercapto, alkylmercapto, diaminophosphinyl, amino, cyano, nitro, alkylamino, dialkylamino, arylmercapto, isocyano, isocyanato, trihalomethyl, alkoxy, thiocyano, alkanoyl, or any two X, Y and Z group together may form an alkylene or alkenylene chain which may optionally include one or more divalent heteroatoms of oxygen, nitrogen or sulfur forming a 3,4,5 or 6 membered fused ring structure.

19. A method according to claim 18 wherein said one or more compounds are applied to said situs prior to, subsequent to or in conjunction with the application to said situs of urea of one or more urea precursor compounds capable of forming urea in situ in said media.

20. A method according to claim 19 wherein said situs is a plant growth medium.

21. A method according to claim 18 wherein said urease inhibiting effective amount is at least about 0.01 ppm.

22. A method according to claim 21 wherein said amount is from about 0.01 to about 5000 ppm.

23. A method according to claim 22 wherein said amount is from about 2 to about 1000 ppm.

24. A method according to claim 23 wherein said amount is from about 10 to about 500 ppm.

25. A composition according to claim 1 wherein said carrier is a liquid.

26. A composition according to claim 25 wherein said liquid carrier is selected from the group consisting of water and organic liquids.

27. A composition according to claim 1 wherein said carrier is a finely divided inert solid.

* * * * *

UNITED STATES PATENT AND TRADEMARK OFFICE
CERTIFICATE OF CORRECTION

PATENT NO. : 4,517,007
DATED : May 14, 1985
INVENTOR(S) : Michael D. Swerdloff et al.

It is certified that error appears in the above-identified patent and that said Letters Patent are hereby corrected as shown below:

Col. 14, line 46, "$R^2$" should read -- $R_2$ --

Col. 14, line 59, "1,3,2-benzodioxophosphole)ester" should read -- 1,3,2-benzodioxophosphole) ester --

Col. 14, line 61, "phole)ester" should read -- phole) ester --

Signed and Sealed this

Twenty-sixth Day of November 1985

[SEAL]

Attest:

DONALD J. QUIGG

Attesting Officer

Commissioner of Patents and Trademarks